(12) United States Patent
Faizakof et al.

(10) Patent No.: US 11,341,986 B2
(45) Date of Patent: May 24, 2022

(54) EMOTION DETECTION IN AUDIO INTERACTIONS

(71) Applicant: Genesys Telecommunications Laboratories, Inc., Daly City, CA (US)

(72) Inventors: Avraham Faizakof, Tel-Aviv (IL); Lev Haikin, Tel-Aviv (IL); Yochai Konig, San Francisco, CA (US); Arnon Mazza, Givatayim (IL)

( * ) Notice: Subject to any disclaimer, the term of this patent is extended or adjusted under 35 U.S.C. 154(b) by 1 day.

(21) Appl. No.: 16/723,154

(22) Filed: Dec. 20, 2019

(65) Prior Publication Data

US 2021/0193169 A1 Jun. 24, 2021

(51) Int. Cl.

| | |
|---|---|
| *G10L 25/63* | (2013.01) |
| *G10L 15/22* | (2006.01) |
| *G10L 15/26* | (2006.01) |
| *G06F 40/30* | (2020.01) |
| *G10L 15/02* | (2006.01) |
| *G10L 15/04* | (2013.01) |
| *G10L 15/06* | (2013.01) |

(52) U.S. Cl.
CPC ............. *G10L 25/63* (2013.01); *G10L 15/02* (2013.01); *G10L 15/04* (2013.01); *G10L 15/063* (2013.01); *G10L 2015/025* (2013.01)

(58) Field of Classification Search
CPC ......... G10L 15/22; G10L 17/26; G10L 25/63; G10L 15/26; G06F 40/30
See application file for complete search history.

(56) References Cited

U.S. PATENT DOCUMENTS

| | | | | |
|---|---|---|---|---|
| 2002/0194002 | A1* | 12/2002 | Petrushin | G10L 17/26 704/270 |
| 2004/0062364 | A1* | 4/2004 | Dezonno | H04M 3/523 379/88.14 |
| 2009/0281807 | A1* | 11/2009 | Hirose | G10L 21/003 704/254 |
| 2012/0089396 | A1* | 4/2012 | Patel | G10L 25/00 704/249 |
| 2019/0253558 | A1* | 8/2019 | Haukioja | G10L 15/22 |
| 2020/0044999 | A1* | 2/2020 | Wu | G06F 16/3329 |
| 2020/0365275 | A1* | 11/2020 | Barnett | G16H 10/20 |

OTHER PUBLICATIONS

PCT Search Report and Written Opinion regarding co-pending PCT application No. PCT/US2020/066312 dated Mar. 15, 2021.

(Continued)

*Primary Examiner* — Shreyans A Patel (57) ABSTRACT

A method comprising: receiving a plurality of audio segments comprising a speech signal, wherein said audio segments represent a plurality of verbal interactions; receiving labels associated with an emotional state expressed in each of said audio segments; dividing each of said audio segments into a plurality of frames, based on a specified frame duration; extracting a plurality of acoustic features from each of said frames; computing statistics over said acoustic features with respect to sequences of frames representing phoneme boundaries in said audio segments; at a training stage, training a machine learning model on a training set comprising: said statistics associated with said audio segments, and said labels; and at an inference stage, applying said trained model to one or more target audio segments comprising a speech signal, to detect an emotional state expressed in said target audio segments.

26 Claims, 4 Drawing Sheets

(56) References Cited

OTHER PUBLICATIONS

Yenigalla et al., Speech Emotion Recognition Using Spectrogram & Phoneme Embedding, Samsung R&D Institute India-Bangalore, Interspeech 2018, Sep. 2-6, 2018, pp. 3688-3692, 10.21437/Interspeech. 2018-1811, Hyderabad.

Lee et all, Emotion Recognition Based On Phoneme Classes, Emotion Research Group—Speech Analysis and Interpretation Lab & Integrated Media Systems Center Department of Electrical Engineering, Department of Computer Science USC Viterbi School of Engineering, University of Southern California.

Satt et al., Efficient Emotion Recognition From Speech Using Deep Learning On Spectrograms, IBM Research-Haifa, Israel, Technion-Israel Institute of Technology, Israel, Interspeech 2017, Aug. 20-24, 2017, pp. 1089-1093, 10.21427/Interspeech. 2017-200, Stockholm, Sweden.

Zhang et al., Attention Based Fully Convolutional Network For Speech Emotion Recognition, National Engineering Laboratory for Speech and Language Information Processing, University of Science and Technology of China, May 2, 2018, Hefei, China.

Povey et al., The Kaldi Speech Recognition Toolkit, IEEE Workshop On Automatic Speech Recognition and Understanding, IEEE Signal Processing Society, 2011.

Ghahremani et al., A Pith Extraction Algorithm Tuned For Automatic Speech Recognition, IEEE International Conference On Acoustics, Speech and Signal Processing, pp. 2494-2498, IEEE, 2014.

Chernykh et al., Emotion Recognition From Speech With Recurrent Neural Networks, arXiv:1701.08071v2, Jul. 5, 2018.

\* cited by examiner

FIG. 1

$$g \; [ \; M(p^1_{1a}), \ldots, M(p^1_{18a}), S(p^1_{1a}), \ldots, S(p^1_{18a}), M(p^1_{1b}), \ldots, M(p^1_{18b}), S(p^1_{1b}), \ldots, S(p^1_{18b}), M(p^1_{1c}), \ldots, M(p^1_{18c}), S(p^1_{1c}), \ldots, S(p^1_{18c}),$$

$$r \; M(p^2_{1a}), \ldots, M(p^2_{18a}), S(p^2_{1a}), \ldots, S(p^2_{18a}), M(p^2_{1b}), \ldots, M(p^2_{18b}), S(p^2_{1b}), \ldots, S(p^2_{18b}), M(p^2_{1c}), \ldots, M(p^2_{18c}), S(p^2_{1c}), \ldots, S(p^2_{18c}),$$

$$E_y \; M(p^3_{1a}), \ldots, M(p^3_{18a}), S(p^3_{1a}), \ldots, S(p^3_{18a}), M(p^3_{1b}), \ldots, M(p^3_{18b}), S(p^3_{1b}), \ldots, S(p^3_{18b}), M(p^3_{1c}), \ldots, M(p^3_{18c}), S(p^3_{1c}), \ldots, S(p^3_{18c}),$$

$$t \; M(p^4_{1a}), \ldots, M(p^4_{18a}), S(p^4_{1a}), \ldots, S(p^4_{18a}), M(p^4_{1b}), \ldots, M(p^4_{18b}), S(p^4_{1b}), \ldots, S(p^4_{18b}), M(p^4_{1c}), \ldots, M(p^4_{18c}), S(p^4_{1c}), \ldots, S(p^4_{18c}) \; ]$$

EMOTION DETECTION IN AUDIO INTERACTIONS

BACKGROUND

The invention relates to the field of automatic, computerized, emotion detection.

Many commercial enterprises conduct and record multiple audio interactions with customers, users or other persons on a daily basis. In many cases, these organizations may want to extract as much information as possible from the interactions, for example, to improve customer satisfaction and prevent customer attrition.

Measurements of negative emotions that are conveyed in customer's speech serve as key performance indicator of customer satisfaction. In addition, handling emotional responses of customers to service provided by organization representatives increases customer satisfaction and decreases customer attrition.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in an embodiment, a method comprising: receiving a plurality of audio segments comprising a speech signal, wherein said audio segments represent a plurality of verbal interactions; receiving labels associated with an emotional state expressed in each of said audio segments; dividing each of said audio segments into a plurality of frames, based on a specified frame duration; extracting a plurality of acoustic features from each of said frames; computing statistics over said acoustic features with respect to sequences of frames representing phoneme boundaries in said audio segments; at a training stage, training a machine learning model on a training set comprising: (i) said statistics associated with said audio segments, and (ii) said labels; and at an inference stage, applying said trained machine learning model to one or more target audio segments comprising a speech signal, to detect an emotional state expressed in said target audio segments.

There is also provided, in an embodiment, a system comprising: at least one hardware processor; and a non-transitory computer-readable storage medium having stored thereon program instructions, the program instructions executable by the at least one hardware processor to: receive a plurality of audio segments comprising a speech signal, wherein said audio segments represent a plurality of verbal interactions; receive labels associated with an emotional state expressed in each of said audio segments; divide each of said audio segments into a plurality of frames, based on a specified frame duration; extract a plurality of acoustic features from each of said frames; compute statistics over said acoustic features with respect to sequences of frames representing phoneme boundaries in said audio segments; at a training stage, train a machine learning model on a training set comprising: (i) said statistics associated with said audio segments, and (ii) said labels; and at an inference stage, apply said trained machine learning model to one or more target audio segments comprising a speech signal, to detect an emotional state expressed in said target audio segments.

There is further provided, in an embodiment, a computer program product comprising a non-transitory computer-readable storage medium having program instructions embodied therewith, the program instructions executable by at least one hardware processor to: receive a plurality of audio segments comprising a speech signal, wherein said audio segments represent a plurality of verbal interactions; receive labels associated with an emotional state expressed in each of said audio segments; divide each of said audio segments into a plurality of frames, based on a specified frame duration; extract a plurality of acoustic features from each of said frames; compute statistics over said acoustic features with respect to sequences of frames representing phoneme boundaries in said audio segments; at a training stage, train a machine learning model on a training set comprising: (i) said statistics associated with said audio segments, and (ii) said labels; and at an inference stage, apply said trained machine learning model to one or more target audio segments comprising a speech signal, to detect an emotional state expressed in said target audio segments In some embodiments, the audio segments are arranged in temporal sequences based on their association with a specified interaction of said verbal interactions.

In some embodiments, boundaries of said temporal sequences are determined based, at least in part, on a continuity of said speech signal in said audio segments.

In some embodiments, the statistics are computed with respect to said temporally-sequenced audio segments, and wherein said labels are associated with an emotional state expressed in said audio segments.

In some embodiments, the training set further comprises vector representations of phonemes defined by said phoneme boundaries.

In some embodiments, the emotional state is one of neutral and negative.

In some embodiments, the acoustic features are selected from the group consisting of: Mel-frequency cepstral coefficients (MFCC), Probability-of-Voicing (POV) features; pitch features; cutoff frequency; signal-to-noise-ratio (SNR) characteristics; speech descriptors; vocal tract characteristics; volume; signal energy; spectral distribution; tilt; sharpness; spectral flux; Chroma features; and zero-crossing rate (ZCR).

In some embodiments, the statistics are selected from the group consisting of mean and standard deviation.

In some embodiments, the phoneme boundaries are obtained based on applying a speech-to-text machine learning model to said audio segments.

In some embodiments, the extracting further comprises a feature normalization stage, and wherein said normalization is performed with respect to at least one of: features associated with all of said frames; features associated with frames representing speech by a particular speaker within an interaction of said verbal interactions; and features associated with said sequences of frames representing phoneme boundaries associated with speech by a particular speaker within an interaction of said verbal interactions.

In some embodiments, the verbal interactions represent conversations between a customer and a call center agent.

In some embodiments, those of said audio segments comprising a speech signal representing speech by said agent are removed from said training set.

In some embodiments, the target audio segments are a temporal sequence of audio segments from an individual verbal interaction.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Disclosed herein are a method, system, and computer program product for automated and accurate emotion recognition and/or detection in a speech signal.

In some embodiments, the present disclosure provides for a machine learning model trained to classify one or more audio segments comprising speech, based on a detected emotion expressed by the speaker in the audio segments.

In some embodiments, the machine learning model is trained on a training set comprising acoustic features extracted from a plurality of audio segments comprising speech utterances, wherein the audio segments are manually annotated with an associated emotion expressed by the speaker, e.g., negative (agitated) or neutral emotion.

In some embodiments, the acoustic features may be extracted from a speech signal, e.g., an input audio segment comprising a speech utterance, at a phoneme level detected in the signal. In some embodiments, the acoustic features may thus be associated with identified phoneme boundaries in the speech signal.

In some embodiments, the present disclosure provides for detecting a phoneme sequence in a speech signal. In some embodiments, the present disclosure provides for detecting the phoneme boundaries and/or representation within the speech signal.

In some embodiments, the present disclosure generates an alignment between the detected phoneme boundaries and a frame sequence in the speech signal, wherein the frames have a specified frame duration, e.g., 25 ms.

In some embodiments, the phoneme-speech signal alignment provides for extracting the acoustic and/or related features from the speech signal, and associating these acoustic features with particular phonemic boundaries in the speech signal.

In some embodiments, an input to the trained machine learning model comprises a sequence of audio segments comprising speech utterances by a speaker. In some embodiments, the emotions expressed by the speaker in a verbal interaction, and specifically negative emotions, may follow a structure comprising several peaks ranging over a period of time. Accordingly, the present disclosure attempts to capture a plurality of audio segments representing an "agitation plot" of a conversation or interaction, to learn and potentially exploit inter-dependencies between emotions expressed within neighboring segments, to increase prediction accuracy and efficacy.

In some embodiments, the present disclosure provides for an emotion detection method which may be deployed to perform emotion detection analysis on verbal interactions, such as telephone conversation recordings. Techniques disclosed herein are particularly useful for emotion detection in telephone conversation recordings in the context of call or contact centers. Contact center interactions are typically at least two sided, comprising of, e.g., an agent and a customer. These interactions can reflect conversations of varying lengths (e.g., from a few minutes to more than one hour), may shift in tone and sentiment over the course of the interaction, and typically have a defined emotional flow or 'agitation plot.'

The present disclosure may thus provide contact center operators with the ability to detect audio contacts with high emotional content, expressed by either a customer or an agent. Agitated customers are prone to repeat calling, initiate escalations to supervisors, complain to customer relations, or churn to other companies. Therefore, it is important to quickly identify contacts where agitation is expressed, and respond promptly to prevent further escalation. The response could be, for example, to send an experienced agent to resolve the controversy with the customer, by cautious negotiation.

The emotion recognition feature can also be used to rate agent performance, e.g., based on an ability to resolve and deescalate tense situations, to identify successful approaches to customer dispute resolution, or, on the other hand, identify agents who may require more advanced training in de-escalation techniques. In addition, the emotion recognition feature may also help to identify agents who tend to become agitated themselves, e.g., express anger. This may further help in improving agent training.

The task of speech emotion recognition has been explored for several decades, and numerous methods have been developed using a variety of algorithmic approaches. The accepted approach is to train a classifier using audio segments of different emotions, teaching the classifier to differentiate the emotions by various properties of the audio, such as pitch and energy. Several algorithms have been used, e.g., support-vector machine (SVM), hidden Markov model (HMM), and various neural networks architectures, e.g., recurrent neural networks (RNN) or attention neural networks. Various approaches have attempted to train machine learning models on, e.g., audio spectrograms representing the speech signal, or a combination of audio spectrogram and associated phoneme sequences. However, these approaches use raw associated phoneme sequences, but do not align them with the audio signal, and therefore these sequences do not affect the manner in which acoustic features are ultimately extracted.

Emotion Detection Task—Experimental Results

The present inventors have conducted an experiment which sought to demonstrate the subjective nature of the task of classifying and detecting emotion in speech. For this purpose, the present inventors obtained 84 recorded speech segments by a plurality of speakers expressing a negative emotion (e.g., an agitated state of emotion). For each of the 'negative' segments, two 'neutral' speech samples by the same speaker, sampled in the course of the same conversation, were selected (using, e.g., a textual recognition algorithm and/or a similar method). In total, the test set contained 238 segments, with a negative-to-neutral ratio of roughly 1:2. Subsequently, all of these segments were manually annotated by three annotators.

The results show that 113 out of the 238 segments were tagged as 'negative' by at least one of the annotators, of which:

24 were consensus annotation by all three annotators,
43 were annotated as negative by only two annotators, and
46 were annotated as negative by only one annotator.

These results are consistent with the scientific literature, and bring into relief the very subjective nature of the speech emotion recognition task. This is even more prominent in the domain of contact centers, where there are often discussions involving financial issues and quality of service complaints, wherein a human annotator may tend to identify with the customer's side, which may in turn affect his or her interpretation of the conversation's tenor.

Based on these experimental results, the present inventors have set an objective for an emotion detection model of the present invention, wherein a classification of a speech signal as 'negative' should be made only consistent with a similar annotation by at least two human annotators.

Collection of Training Data

In some embodiments, a training dataset may be constructed for training a speech emotion detection machine learning model of the present disclosure.

In some embodiments, the training dataset may comprise a plurality (e.g., thousands) of relatively short audio segments comprising speech utterances, with a duration of approx. 5 seconds on average.

In some embodiments, the plurality of audio segments are manually annotated as expressing either a negative or neutral emotion.

In some embodiments, the manual annotations are based solely on the acoustic aspects of the audio segments, while ignoring the textual content.

In some embodiments, the training dataset includes audio segments representing whole and/or significant portions of individual verbal interactions. In some embodiments, the training dataset identifies and/or groups together segments representing individual interactions. In some embodiments, the training dataset may also include, e.g., only a single segment from one or more interactions, multiple randomly-chosen segments from one or more interactions, and/or assorted segments from multiple interactions.

In some embodiments, using segments representing whole and/or significant portions of individual verbal interactions may provide for more accurate prediction results. Because the expression of emotions is highly individual and depends on the speaker, it may be advantageous, in some implementations, to include samples covering a range of tones and/or tenors expressed by the same speaker, e.g., associated with negative and neutral speech samples from the same speakers. In addition, multiple segments covering whole and/or significant portions of individual verbal interactions may provide inter-related context. For example, experimental results by the present inventors have shown that negative segments tend to be adjacent to one another within an arc of a conversation. Accordingly, the temporal placement of a segment may harbor indicative power as to its emotional content, and thus may aid in improving predictive results.

In some embodiments, this approach may be advantageous for the task of acoustic features normalization. In some embodiments, this approach may be advantageous in the context of manual annotation, because it may provide annotators with a broader perspective of a range of expressive speech by the same speaker, to aid in distinguishing between different emotions. For example, high pitch generally may indicate agitation, but if a speaker's voice has a natural high pitch, then agitated segments of that speaker will likely reflect a particularly high pitch.

In some embodiments, the training dataset comprises a negative-to-neutral segment ratio reflecting and/or approximating actual ratios gleaned from call center interactions. In some embodiments, the training dataset has a negative-to-neutral ratio of approximately 4:1.

Audio Feature Extraction

In some embodiments, audio segments comprising a speech signal included in the training dataset may undergo an acoustic feature extraction stage. In some embodiments, in a pre-processing stage, an audio segment may be divided into frames of, e.g., 25 ms in length, with a step of, e.g., 10 ms. Accordingly, for example, a segment of 5 seconds may be divided into 500 frames. In other instances, different frame lengths and step sizes may be used, e.g., longer or shorter frame lengths and overlap sections.

In some embodiments, a sampling rate of 8000 Hz may be used to sample acoustic features, wherein a frame of 25 ms may be sampled 200 times. In some embodiments, other sampling rates may be used, e.g., higher or lower sampling rates.

In some embodiments, short-term acoustic features may be extracted and/or computed, which may include one or more of: Mel-frequency cepstral coefficients (MFCC), Probability-of-Voicing (POV) features; pitch features, cutoff frequency, signal-to-noise-ratio (SNR) characteristics, speech descriptors, vocal tract characteristics, volume, signal energy, spectral distribution, tilt, sharpness, spectral flux, Chroma features, and/or zero-crossing rate (ZCR).

In some embodiments, certain of the features may be extracted using, e.g., a Kaldi ASR toolkit (see Daniel Povey et al., "The Kaldi speech recognition toolkit", In IEEE 2011 workshop on automatic speech recognition and understanding, no. CONF. IEEE Signal Processing Society, 2011). In other implementations additional and/or other features extraction tools and/or techniques may be used.

In some embodiments, between 5 and 30 short term acoustic features, e.g., 18, may be extracted with respect to each frame, for a total of 1800 values per second of audio.

In some embodiments mid-term features may be extracted and/or computed, for longer windows of an audio signal than a single frame (e.g., windows having a duration of between tens to hundreds of milliseconds). In some embodiments mid-term features comprise statistical computations of short-term features over the duration of such windows. For example, by computing, e.g., mean, standard deviation, and/or other statistics with respect to a feature over two or more consecutive frames or portions thereof.

It has been shown that emotional state has varying effects on different phonemes (see, e.g., Chul Min Lee et al., "Emotion Recognition based on Phoneme Classes", Eighth International Conference on Spoken Language Processing, 2004). Based on this observation, an obvious problem in arbitrary division to mid-term time windows is that features of different phonemes are mixed; for example, it makes no sense to average pitch values of vowels and consonants. Therefore, in some embodiments, the present disclosure seeks to provide for an alignment between frames and phonemes, which will better enable setting the boundaries of mid-term windows based on the phonemes they represent.

Phoneme alignment is the task of proper positioning of a sequence of phonemes in relation to a corresponding continuous speech signal. This problem is also referred to as phoneme segmentation. An accurate and fast alignment procedure is a necessary tool for developing speech recognition and text-to-speech systems. In some embodiments, phoneme alignment is provided by a trained speech-to-text machine learning model.

In some embodiments, mid-term windows used for computing feature statistics provide for windows of varying lengths and/or frame number, wherein window boundaries are determined in accordance with aligned phoneme boundaries within the speech signal.

Feature Normalization

In some embodiments, before computing statistics of short term features, the short-term features may be standardized with respect to, e.g., the following categories:

(a) All frames in the data;
(b) all frames associated with a particular speaker within an interaction; and/or
(c) all frames that represent a similar phoneme and belong to the same speaker.

Figure 1:
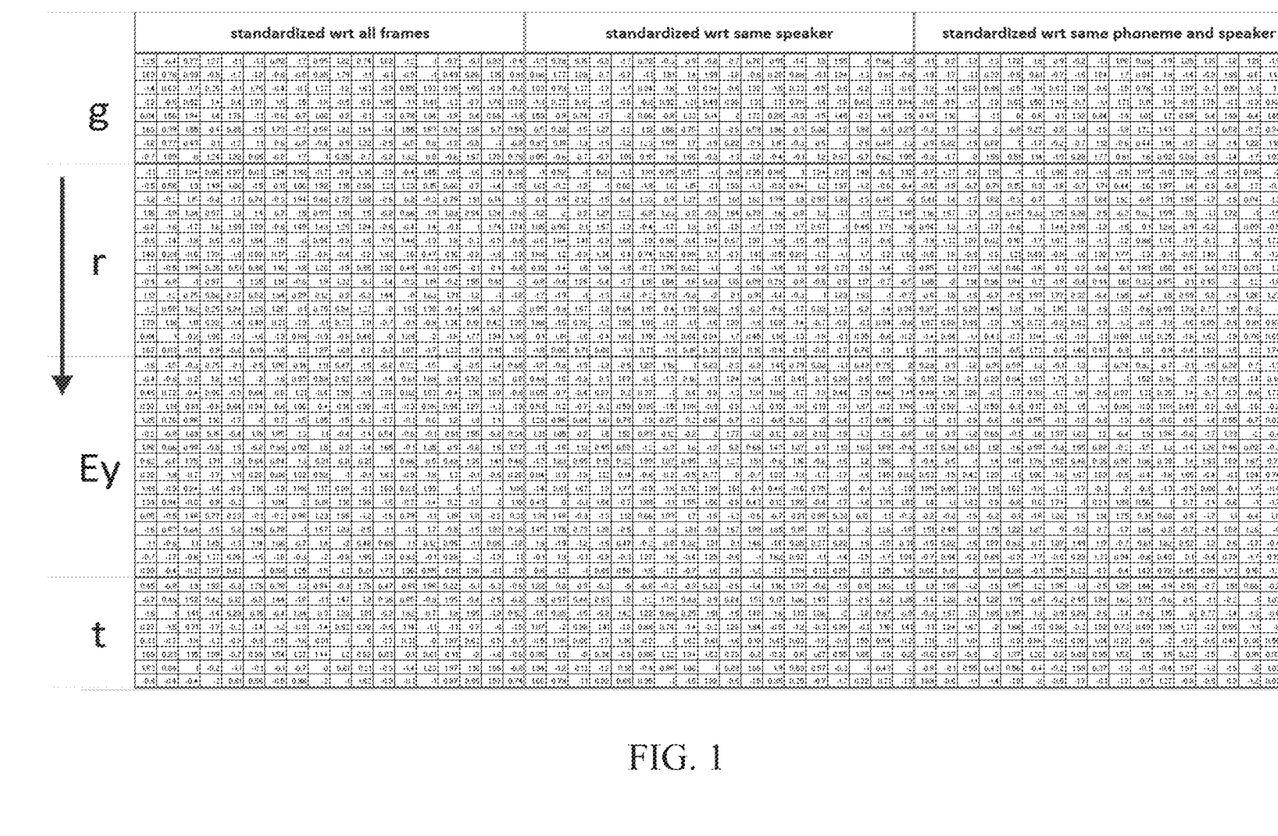
FIG. 1 shows an exemplary frame-level feature extraction scheme, in accordance with some embodiments of the present invention.

FIG. 1 shows an exemplary frame-level feature extraction scheme in accordance with some embodiments of the present invention.

Figure 2:
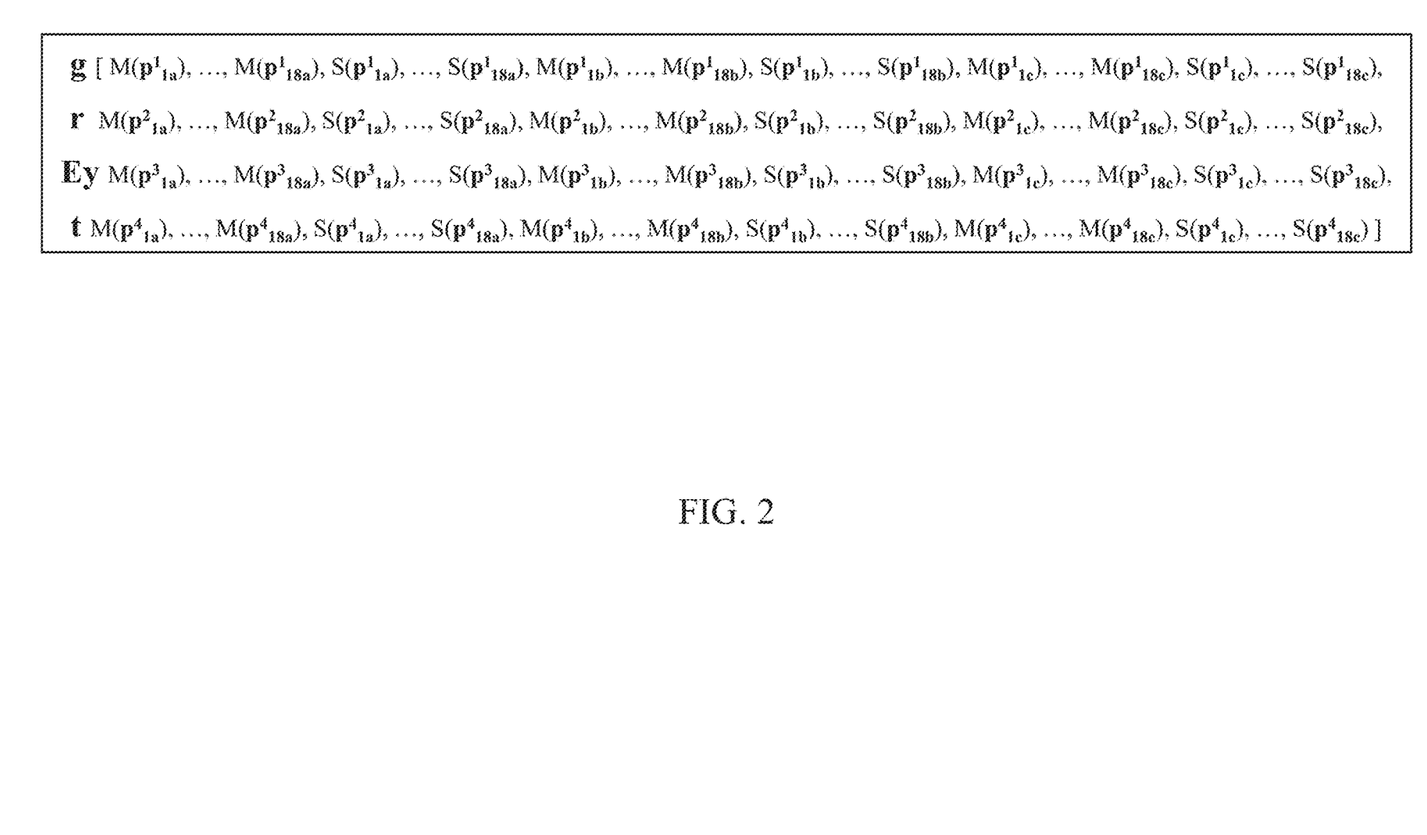
FIG. 2 shows mid-term features calculated from the frame-level features, in accordance with some embodiments of the present invention.

FIG. 2 shows mid-term features calculated from the frame-level features in FIG. 1, wherein M denotes the mean function, S denotes the standard deviation function, and $p_{i,d}^k$ is the vector representing the $i^{th}$ feature ($1 \leq i \leq 18$) standardized by method d, throughout the frames of phoneme pˆk, k=1, 2, 3, 4.

Phoneme Rate

In some embodiments, as an additional phoneme-level feature, a local phoneme rate may be calculated, which measures the phoneme rate in a window of, e.g., two seconds around each phoneme. This feature, computed as (#num−phonemes/#frames) accounts for the speed of talking, and is standardized once per speaker and once with respect to the whole data.

The Classification Algorithm—Architecture

In some embodiments, the present disclosure provides for an emotion detection machine learning model which is based on a neural network. In some embodiments, a neural network architecture of the present disclosure is configured to take into account the sequential characteristics of an individual audio segment, with the basic unit being a phoneme, as well as the sequential nature of segments in a conversation.

In some embodiments, the present disclosure employs a BiLSTM-CRF (bidirectional LSTM with a conditional random field layer on top) architecture, which receives, at each timestamp, a set of segment-level features computed by another BiLSTM.

In some embodiments, the inner neural network, which is executed per audio segment, receives as input a sequence of phoneme-level features (that is, its timestamps correspond to the phoneme changes in the segment). These features are the 108 mid-term statistics plus the two phoneme rate values, as described above. To these there are added vector representations (e.g., a one-hot representation) of the phoneme, embedded into a layer of size 60, which is also learned during training. The inner network (or the segment-level network) is connected to the outer network (or the document-level network) through the last hidden state of the former, which is forwarded as input to the latter. In some embodiments, the document-level network is a BiLSTM-CRF, as it takes into account both the output features at the "tag" layer (containing two neurons, "neutral" and "negative") and the transition probabilities between tags of consecutive segments.

Figure 3:
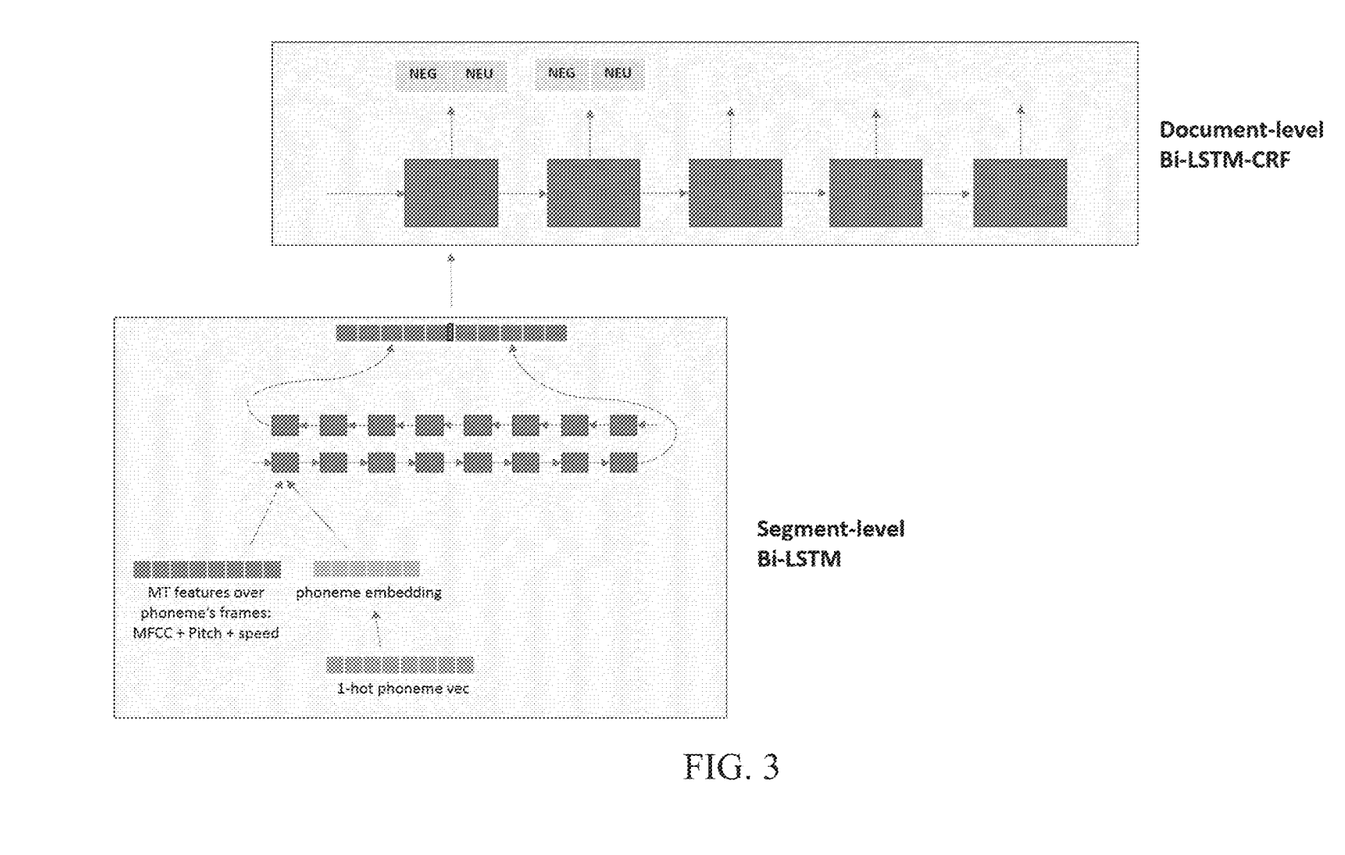
FIG. 3 illustrates an exemplary neural network, in accordance with some embodiments of the present invention of the present disclosure.

FIG. 3 illustrates an exemplary neural network of the present disclosure. In some embodiments, this architecture resembles similar networks employed in the context of named entity recognition, in which the outer network's timestamps correspond to words in a sentence and the inner network produces word features by scanning each word's characters.

The Classification Algorithm—Training

In some embodiments, a training dataset of the present disclosure may comprise a series of subsequent audio segments representing a speech signal from a plurality of interactions, e.g., conversation recordings in the context of call or contact centers.

In some embodiments, a training dataset of the present disclosure may comprise sequences of sequential audio segments from an interaction. In some embodiments, each such sequential sequence comprises two or more audio segments comprising a speech signal by a speaker. In some embodiments, one or more particular interactions may each be represented by a plurality of sequential sequences of varying lengths.

In some embodiments, the audio segments in each sequence are arranged based, e.g., on a start time value of each segment. In some embodiments, audio segment sequence boundaries within an interaction are determined based, e.g., on speech signal gaps. For example, natural conversations contain lulls or gaps, e.g., when a call is placed on hold, or when a speaker remains silent for a period of time. In some embodiments, a gap in a speech signal of e.g., between 3 and 7 seconds, e.g., 5 seconds, may define a starting point of new sequence in the interaction.

In some embodiments, a training dataset of the present disclosure may be constructed of audio segment sequences. In some embodiments, the training dataset may comprise portions of sequences (i.e., sub-sequences), wherein each sub-sequence is composed of between, e.g., 5 and 15 adjacent segments. In some embodiments, whole sequences having a fewer than 5 consecutive segments may be used in their entirety.

In some embodiments, a construction process of a training dataset of the present disclosure further comprises a step of removing from the sequences and sub-sequences audio segments comprising speech signal associated with an agent in call center interactions. In some embodiments, audio segment comprising customer-side speech signal may be combined within a sequence even if they are interspersed with an agent-side speech signal. This approach reflects the idea that an agitation state of a customer will be maintained throughout a sequence even if it is interrupted with an agent-side speech.

The Classification Algorithm—Inference

In some embodiments, a trained machine learning model of the present disclosure may be applied to a target audio section comprising a speech signal, e.g., a conversation, to generate a prediction regarding an emotional state of the speaker.

In some embodiments, the target audio section may be divided into segments with a duration of a few seconds each, based on detected gaps in the speech signal (e.g., points of silence). In some embodiments, the trained machine learning model may be applied to the sequence of segments, to generate an output comprising, e.g., a classification (e.g., negative or neutral) and a confidence score.

In some embodiments, the BiLSTM-CRF layer of the neural network of the present machine learning model comprises a trained transition score matrix reflecting the likelihood of transitioning between any two classes in subsequent segments. In some embodiments, the most likely path—that is, assignment of segments $s_1, \ldots, s_n$ to output classes $o_1, \ldots, o_n$—can be decoded using the Viterbi algorithm, which takes into account both the class scores per segment and the transition matrix.

In some embodiments, the confidence score may represent a predicted emotion level with respect to an audio segment. In some embodiments, to provide for a smooth transition of a confidence score between subsequent segments, the present disclosure provides for a confidence score which represents contextual emotion of neighboring audio segments. Accordingly, in some embodiments, a confidence (or probability) is computed using the forward-backward algorithm, wherein the probability of segment $s_i$ being classified as 'negative' equals the sum of scores of all paths going through ($s_i$, negative), divided by the sum of scores of all possible paths for the sequence $s_1, \ldots, s_n$.

Figure 4:
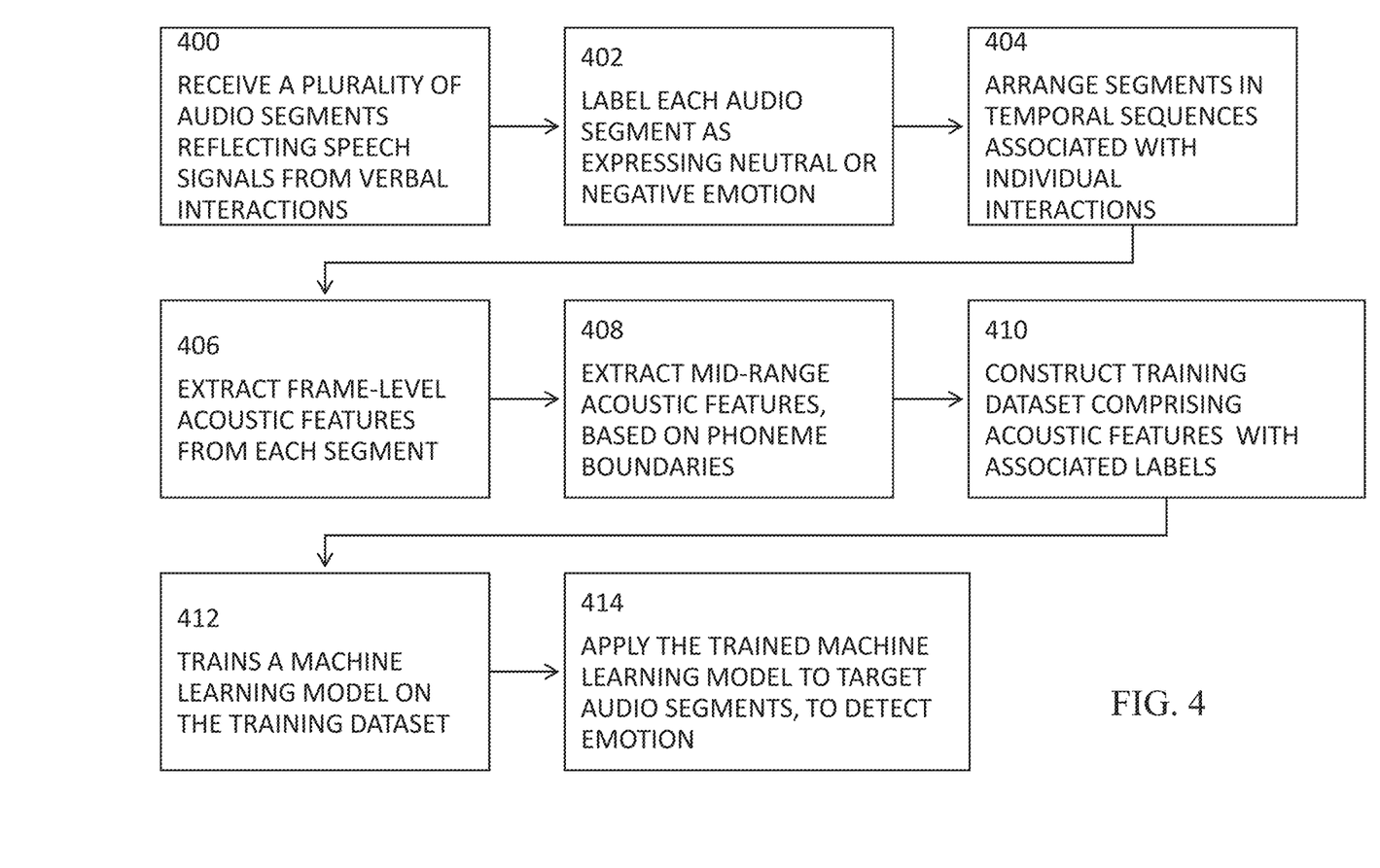
FIG. 4 is a flow chart illustrating the functional steps in a process for training a machine learning model to classify audio segments comprising speech, in accordance with some embodiments of the present invention of the present disclosure.

FIG. 4 is a flow chart illustrating the functional steps in a process for training a machine learning model to classify audio segments comprising speech, based on acoustic features extracted from the audio segments.

At step 400, a plurality of audio segments reflecting speech signals from verbal interactions are received. In some embodiments, the interactions reflect, e.g., conversation recordings in the context of call or contact centers.

At step 402, each audio segment is labeled or annotated with an emotion expressed by a speaker in the segment, e.g., 'neutral' or 'negative.' In some embodiments, the annotating or labeling process is performed with respect to temporal sequences of segments comprising portions of, or whole, interactions, to enhance the ability of the annotator to perceive speaker-dependent idiosyncrasies in the expression of emotions.

At step 404, the annotated segments are arranged in temporal sequences associated with individual interactions by a speaker. In some embodiments, sections or portions of sequences comprising between 5 and 15 adjacent segments are extracted from the sequences. In some embodiments, segments representing a speech signal from an agent-side of the interactions are removed prior to further processing.

At step 406, acoustic features are extracted from the audio segments. In some embodiments, frame-level acoustic features are extracted from each frame (e.g., approx. 25 ms in duration).

In some embodiments, at step 408, mid-term features (i.e., representing multiple frames) are extracted. In some embodiments, window boundaries for extracting mid-term features are determined based, at least in part, on detected phoneme boundaries in the speech signal.

In some embodiments, at step 410, a training dataset is constructed, comprising frame-level acoustic features, mid-term acoustic features, and the annotations associated with the audio segments.

In some embodiments, at step 412, a machine learning model is trained on the training dataset.

In some embodiments, at step 414, at an inference stage, the trained machine learning model is applied to one or more target audio segments, to detect emotion in the audio segments. In some embodiments, the target audio segments comprise interactions which reflect, e.g., conversation recordings in the context of call or contact centers. In some embodiments, the inference stage input comprises frame-level and/or mid-level acoustic features extracted from the target audio segments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of a numerical range should be considered to have specifically disclosed all the possible subranges as well as individual numerical values within that range. For example, description of a range from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Experiments conducted and described above demonstrate the usability and efficacy of embodiments of the invention. Some embodiments of the invention may be configured based on certain experimental methods and/or experimental results; therefore, the following experimental methods and/or experimental results are to be regarded as embodiments of the present invention.

What is claimed is:

1. A method comprising:
  receiving a plurality of audio segments comprising a speech signal, wherein said audio segments represent a plurality of verbal interactions;
  receiving labels associated with an emotional state expressed in each of said audio segments;
  dividing each of said audio segments into a plurality of frames, based on a specified frame duration;
  extracting a plurality of acoustic features from each of said frames;
  computing statistics over said acoustic features with respect to sequences of frames representing phoneme boundaries in said audio segments;
  at a training stage, training a machine learning model on a training set comprising:
    (i) said statistics associated with said audio segments, and
    (ii) said labels; and
  at an inference stage, applying said trained machine learning model to one or more target audio segments comprising a speech signal, to detect an emotional state expressed in said target audio segments and a confidence score related to a probability of the detected emotional state being correct;
  wherein the confidence score is calculated to represent contextual emotion given emotional states of neighboring audio segments of the target audio segment.

2. The method of claim 1, wherein said audio segments are arranged in temporal sequences based on their association with a specified interaction of said verbal interactions.

3. The method of claim 2, wherein boundaries of said temporal sequences are determined based, at least in part, on a continuity of said speech signal in said audio segments.

4. The method of claim 2, wherein said statistics are computed with respect to said temporally-sequenced audio segments, and wherein said labels are associated with an emotional state expressed in said audio segments.

5. The method of claim 1, wherein said training set further comprises vector representations of phonemes defined by said phoneme boundaries;

wherein the confidence score is calculated to represent the contextual emotion given the emotional states of the neighboring audio segments using a forward-backward algorithm.

6. The method of claim 5, wherein said emotional state is one of neutral and negative; and wherein the forward-backward algorithm comprises calculating the probability for the confidence score of the target audio segment as being equal to a sum of confidence scores of all paths going through the target audio segment divided by a sum of confidence scores of all possible paths for a sequence including the target audio segment and the neighboring audio segments.

7. The method of claim 6, wherein said acoustic features are selected from the group consisting of: Mel-frequency cepstral coefficients (MFCC), Probability-of-Voicing (POV) features; pitch features; cutoff frequency; signal-to-noise-ratio (SNR) characteristics; speech descriptors; vocal tract characteristics; volume; signal energy; spectral distribution; tilt; sharpness; spectral flux; Chroma features; and zero-crossing rate (ZCR); and wherein the emotional states of the labels of the received plurality of audio segments comprise a negative-to-neutral ratio of 4:1.

8. The method of claim 1, wherein said statistics are selected from the group consisting of mean and standard deviation; and wherein the machine learning model comprises a neural network architecture configured to take into account sequential characteristics of each of the audio segments, with a basic unit thereof being a phoneme, and a sequential nature of the audio segments in a corresponding one of the verbal interactions.

9. The method of claim 1, wherein said phoneme boundaries are obtained based on applying a speech-to-text machine learning model to said audio segments; and wherein the machine learning model comprises a neural network having a bidirectional long short-term memory with a conditional random field (BiLSTM-CRF) architecture.

10. The method of claim 1, wherein said extracting further comprises a feature normalization stage, and wherein said normalization is performed with respect to at least one of: features associated with all of said frames; features associated with frames representing speech by a particular speaker within an interaction of said verbal interactions; and features associated with said sequences of frames representing phoneme boundaries associated with speech by a particular speaker within an interaction of said verbal interactions.

11. The method of claim 1, wherein said verbal interactions represent conversations between a customer and a call center agent.

12. The method of claim 11, wherein those of said audio segments comprising a speech signal representing speech by said agent are removed from said training set.

13. The method of claim 1, wherein said target audio segments are a temporal sequence of audio segments from an individual verbal interaction.

14. A system comprising:
at least one hardware processor; and
a non-transitory computer-readable storage medium having stored thereon program instructions, the program instructions executable by the at least one hardware processor to:
receive a plurality of audio segments comprising a speech signal, wherein said audio segments represent a plurality of verbal interactions;
receive labels associated with an emotional state expressed in each of said audio segments;
divide each of said audio segments into a plurality of frames, based on a specified frame duration;
extract a plurality of acoustic features from each of said frames;
compute statistics over said acoustic features with respect to sequences of frames representing phoneme boundaries in said audio segments;
at a training stage, train a machine learning model on a training set comprising:
(i) said statistics associated with said audio segments, and
(ii) said labels; and
at an inference stage, apply said trained machine learning model to one or more target audio segments comprising a speech signal, to detect an emotional state expressed in said target audio segments and a confidence score related to a probability of the detected emotional state being correct;
wherein the confidence score is calculated to represent contextual emotion given emotional states of neighboring audio segments of the target audio segment.

15. The system of claim 14, wherein said audio segments are arranged in temporal sequences based on their association with a specified interaction of said verbal interactions.

16. The system of claim 15, wherein boundaries of said temporal sequences are determined based, at least in part, on a continuity of said speech signal in said audio segments.

17. The system of claim 15, wherein said statistics are computed with respect to said temporally-sequenced audio segments, and wherein said labels are associated with an emotional state expressed in said audio segments.

18. The system of claim 14, wherein said training set further comprises vector representations of phonemes defined by said phoneme boundaries;

wherein the confidence score is calculated to represent the contextual emotion given the emotional states of the neighboring audio segments using a forward-backward algorithm.

19. The system of claim 18, wherein said emotional state is one of neutral and negative; and wherein the forward-backward algorithm comprises calculating the probability for the confidence score of the target audio segment as being equal to a sum of confidence scores of all paths going through the target audio segment divided by a sum of confidence scores of all possible paths for a sequence including the target audio segment and the neighboring audio segments.

20. The system of claim 19, wherein said acoustic features are selected from the group consisting of: Mel-frequency cepstral coefficients (MFCC), Probability-of-Voicing (POV) features; pitch features; cutoff frequency; signal-to-noise-ratio (SNR) characteristics; speech descriptors; vocal tract characteristics; volume; signal energy; spectral distribution; tilt; sharpness; spectral flux; Chroma features; and zero-crossing rate (ZCR); and wherein the emotional states of the labels of the received plurality of audio segments comprise a negative-to-neutral ratio of 4:1.

21. The system of claim 14, wherein said statistics are selected from the group consisting of mean and standard deviation deviation; and wherein the machine learning model comprises a neural network architecture configured to take into account sequential characteristics of each of the audio segments, with a basic unit thereof being a phoneme, and a sequential nature of the audio segments in a corresponding one of the verbal interactions.

22. The system of claim 14, wherein said phoneme boundaries are obtained based on applying a speech-to-text machine learning model to said audio segments; and wherein the machine learning model comprises a neural network having a bidirectional long short-term memory with a conditional random field (BiLSTM-CRF) architecture.

23. The system of claim 14, wherein said extracting further comprises a feature normalization stage, and wherein said normalization is performed with respect to at least one of: features associated with all of said frames; features associated with frames representing speech by a particular speaker within an interaction of said verbal interactions; and features associated with said sequences of frames representing phoneme boundaries associated with speech by a particular speaker within an interaction of said verbal interactions.

24. The system of claim 14, wherein said verbal interactions represent conversations between a customer and a call center agent.

25. The system of claim 24, wherein those of said audio segments comprising a speech signal representing speech by said agent are removed from said training set.

26. The system of claim 14, wherein said target audio segments are a temporal sequence of audio segments from an individual verbal interaction.

\* \* \* \* \*